Aug. 14, 1934.  F. C. WASHBURN  1,970,263
ROLL
Filed June 10, 1933  3 Sheets-Sheet 1

Inventor,
Frederick C. Washburn,
by Roberts, Cushman & Woodbury
Attys.

Aug. 14, 1934. F. C. WASHBURN 1,970,263
ROLL
Filed June 10, 1933 3 Sheets-Sheet 2
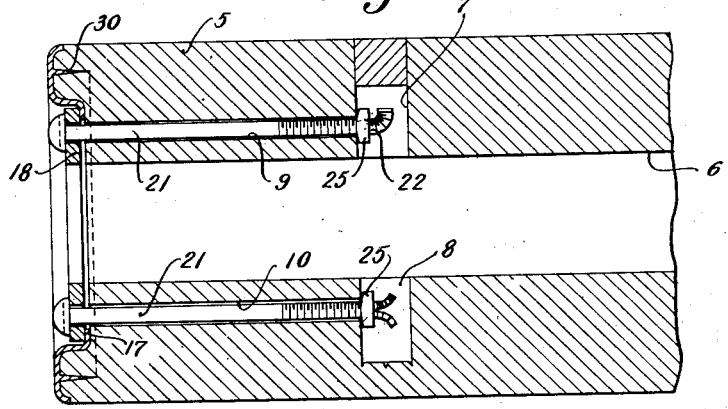
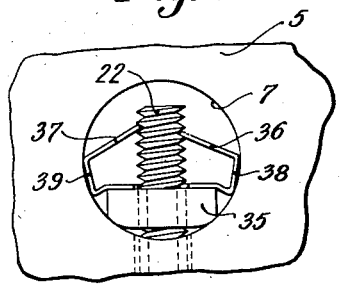
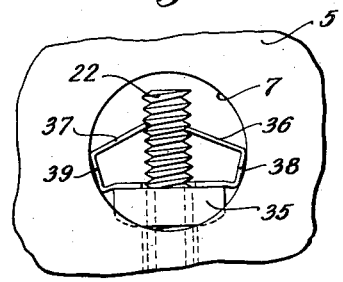
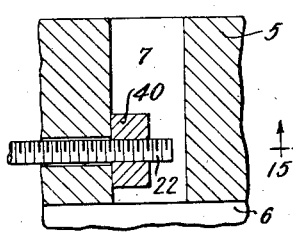
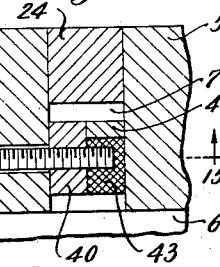
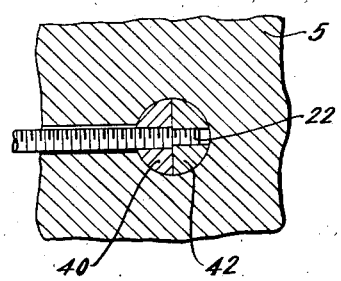
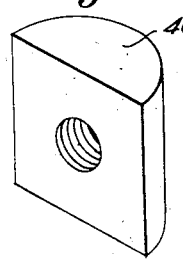
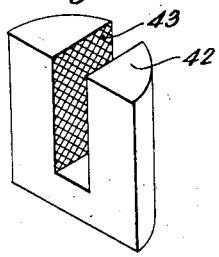
Inventor,
Frederick C. Washburn,
by ...
Attys.

Aug. 14, 1934.    F. C. WASHBURN    1,970,263
ROLL
Filed June 10, 1933    3 Sheets-Sheet 3

Inventor,
Frederick C. Washburn,
by Roberts, Cushman & Woodberry
Attys.

Patented Aug. 14, 1934

1,970,263

UNITED STATES PATENT OFFICE 1,970,263

ROLL

Frederick C. Washburn, New Bedford, Mass.

Application June 10, 1933, Serial No. 675,196

7 Claims. (Cl. 242—68)

This invention relates to rolls or core pieces of the type commonly used in both the textile and paper industries for winding either strand or sheet material. As the length of the core piece or roll usually exceeds the width of the fabric or sheet to be wound and as the weight of material wound on a roll often exceeds 250 lbs., it is not only desirable that the rolls themselves be made as light as possible, consistent with adequate strength to provide a rugged and durable construction, but also that the projecting ends of the roll be protected against injury.

Heretofore it has been customary to furnish wooden rolls with metal ferrules on their ends in the attempt to provide the desired protection, and also provide the roll with means adapted to cooperate with a driving element and capable of sustaining the stresses imposed during the winding operation. When such a roll is subjected to the varying moisture conditions encountered both in the textile and paper industries, for example, wet process operations, the roll swells or expands and later contracts when it becomes dry. This alternate expansion and contraction so loosens the protecting ferrules ordinarily employed that they become inoperative for their intended purposes, and permit damage to the ends of the roll which they are designed to protect. In order to overcome this difficulty it has been proposed to provide the ferrules with inturned lips or detents or similar fastening elements. Such constructions, however, have proved generally unsatisfactory after a comparatively short period of use apparently to the relative movement which develops between the body portion of the roll and the ferrule, caused by repeated expansions and contractions, which eventually cuts away or splits the relatively soft body portion of the roll in which the detents are embedded.

In some instances efforts have been made to overcome these difficulties by providing a metal sleeve which extends longitudinally through the roll from end to end, such sleeve usually having a polygonal cross section to receive and to form an interlocking connection with the driving shaft of the winder. Such constructions are objectionable in that they are quite expensive and unduly increase the weight of the roll.

The principal object of this invention is to provide an improved roll of the aforesaid type which is of simple design and inexpensive to manufacture, which is of light weight and strong and durable construction, and which overcomes the difficulties heretofore encountered.

In accordance with the present invention, the body portion of the roll or core piece may be of wood or any relatively light and rigid material. The end portions of the roll are provided with caps or ferrules which are secured to the body portion of the roll in a manner that not only affords an effective protection to the ends of the roll, but also provides a rugged and durable driving connection between the roll and the driving shaft of a winder. Preferably this result is accomplished by the employment of a unit comprising an end cap or ferrule and an end driving plate or disk which, if desired, may be integrally united. The cap and driving member are secured to the body of the roll by fastening elements which extend longitudinally of the roll and are so locked or anchored to the body portion of the roll as to prevent appreciable loosening, regardless of the conditions to which the roll may be subjected. As the expansion or contraction of the roll occurs principally in a direction radially of its axis, the longitudinally disposed fastening elements are substantially unaffected by such changes and consequently are capable of functioning indefinitely to hold the driving plate firmly in fixed position.

If desired, the ferrule and driving plate may be connected so as to permit a slight radial movement of the ferrule relative to the plate, as such an arrangement permits the ferrule to shift its position by the minute amount sufficient to compensate possible unequal expansions of the body portion of the roll and also to sustain heavy blows or impact without transmitting the resulting stresses directly to the driving disk so as to cause a corresponding shift of the latter which might tend to throw the same out of alignment.

In the drawings:

Fig. 8 is a view similar to Fig. 2 illustrating a modified type of ferrule and certain desirable ways of anchoring the fastening elements to the body of the roll;

Figs. 9 and 10 are views illustrating another manner of anchoring the fastening elements;

Figs. 11 and 12 are perspective views of a further type of anchoring member;

Fig. 13 is a section through a portion of a roll illustrating the manner in which the anchoring member shown in Fig. 11 is associated with the fastening element;

Fig. 14 is a view similar to Fig. 13 showing both anchoring members in assembled relation with the fastening element;

Fig. 15 is a section on the line 15—15 of Fig. 14;

Figure 2:
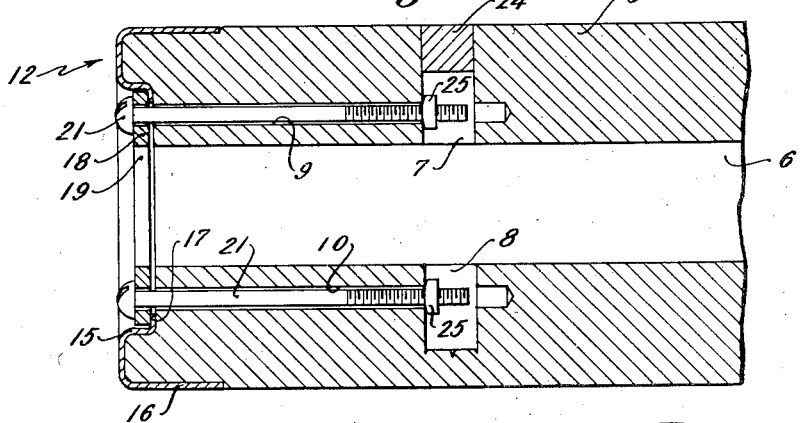
Fig. 2 is an enlarged sectional view of one end of the roll.

Figs. 16, 18, 20 and 22 are sectional views similar to Fig. 2, showing modified constructions embodying integral cap and driving members; and Figs. 17, 19, 21 and 23 are end views of the rolls shown in Figs. 16, 18, 20 and 22, respectively.

Figure 1:
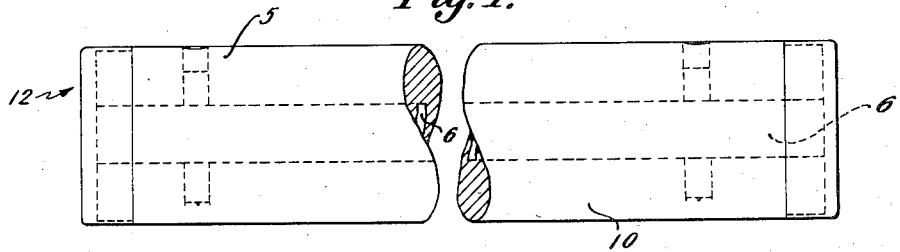
Fig. 1 is a longitudinal elevation of a roll constructed in accordance with my invention.

Referring to Figs. 1 and 2, the numeral 5 designates the body portion of a cylindrical wooden roll which is provided with an axial bore 6 adapted, for example, to receive the driving arbor or shaft of a winder. The ends of the roll are recessed as shown in Fig. 2 to provide a seat for the annular shaped-metal ferrules or caps designated generally by the numeral 12. Adjacent to each end the body portion of the roll is drilled to provide transverse openings 7 and 8 on opposite sides of its central axis, and also to provide longitudinally extending openings 9 and 10 which communicate with openings 7 and 8, respectively. Each ferrule comprises spaced inner and outer concentric flanges 15 and 16, respectively, the inner flange having a radially extending lip 17 and fitting into the recess in the end of the roll, the inner flange and lip thus constituting in effect a concentric lining for the recess. Preferably, as shown in Fig. 2, the diameter of the opening in the ferrule is greater than the diameter of the bore 6 for reasons to be set forth hereinafter.

A cap retaining member 18 is disposed in the lined recess defined by the inner flange 15 of the cap or ferrule. Preferably the member 18 is a strong and rigid disk of metal, and in addition to its function as a retaining means for the cap, it may also constitute a driving element, and for the latter purpose is provided with an opening 19 which registers with the bore 6 of the roll. Although the particular shape of the opening 19 is not material, so long as it affords a driving connection between a driving shaft and the roll, its shape is preferably such as to afford protection to the inner surface of the end portion of the relatively soft body of the roll. At diametrically opposite points adjacent to its edge the plate is provided with openings to receive the fastening elements or bolts 21 which pass through the axial openings 9 and 10 in the body of the roll and project into the transverse openings 7 and 8. The ends of the fastening elements are threaded to receive the nuts 25 which lock or anchor the same in fixed position, said nuts being located in the openings 7 and 8 respectively. After the nuts have been locked in position, as hereafter suggested, the outer end of the opening 7 may be closed by a plug 24 or equivalent means. The driving plate is thus rigidly connected to the body portion of the roll and the ferrule is held in place.

Figure 3:
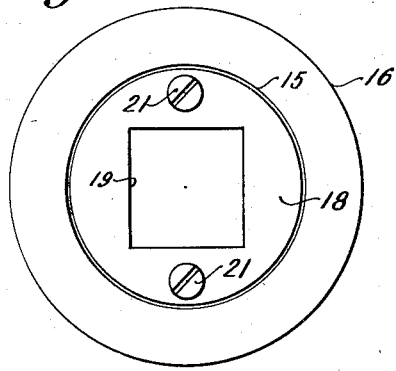
Fig. 3 is an enlarged end view of the roll.
Figure 4:
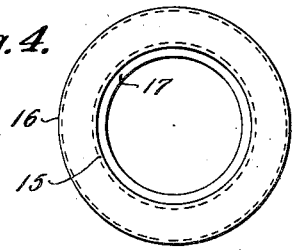
Figs. 4 and 5 are top and bottom views respectively of the ferrule or cap.
Figure 5:
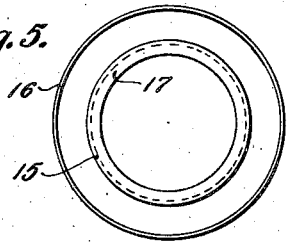
Figure 6:
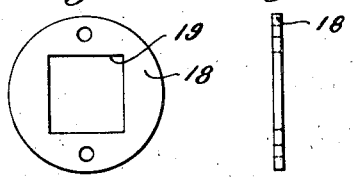
Figs. 6 and 7 are front and side views respectively of the driving plate.
Figure 7:

As shown in Figs. 2 and 3, there is a slight clearance between the periphery of the plate 18 and the inner flange 15 of the ferrule and also between each of the fastening elements and the lip 17, thus permitting a slight radial movement of the ferrule relative to the plate. Thus, the ferrule is permitted a slight shift in position to respond to heavy blows or impacts, or any unequal expansion or swelling of the roll, without producing a corresponding shift in the position of the driving plate which would result in an offset position thereof relative to the axis of the roll.

In order to prevent accidental loosening of the driving plate and ferrule the fastening elements may be permanently anchored or locked to the body portion of the roll. To this end the threaded end portions 22 of the fastening elements may be peened, bent or split, as shown in Fig. 8, to prevent the nuts from turning. Other methods for accomplishing this same end are shown in Figs. 9 to 15.

The roll shown in Fig. 8 is similar to that shown in Fig. 2, but embodies a modified type of ferrule which is provided with an annular flange 30 intermediate the inner and outer flanges 15 and 16, the flange 30 being embedded in the end of the roll in order to provide a firmer grip.

The embodiment of means for locking the fastening elements as shown in Figs. 9 and 10 comprises a nut 35 which carries a washer having a pair of oppositely disposed spring steel wings 36 and 37 which are drawn over the threaded end of the bolt as the nut is tightened so that their bight portions 38 and 39 engage the walls of the opening and cause their free ends to grip and bite into the relatively softer end of the bolt. Further tightening of the nut causes the same to be drawn into the wood, as shown by the dotted lines in Fig. 10, and also increases the grip of the wings, thus securely locking the fastening elements against accidental loosening.

In the embodiment shown in Figs. 11 to 15 a special nut 40 is used, the nut preferably being semi-cylindrical to fit one-half the opening 7, as shown in Fig. 15. A semi-cylindrical metallic plug 42 fits into the other half of the opening, the plug having a slotted portion which is provided with knurled inner surfaces 43. The plug is of chilled cast iron or other relatively hard metal and the width of its slotted portion is somewhat less than the diameter of the threaded end of the bolt 21 so that when it is driven in place (Fig. 14), the threaded end of the bolt is lacerated and firmly held thereby, as shown in Fig. 15.

In the embodiments shown in Figs. 16 to 22, inclusive, the general construction of each of the rolls 5 is substantially the same as that shown in the previously described embodiments. The cap and anchoring disk are, however, integral and constitute a unitary member which may be secured to the body portion of the roll by fastening elements which extend longitudinally of the roll as in the embodiments shown in Figs. 2 and 8.

Figure 17:
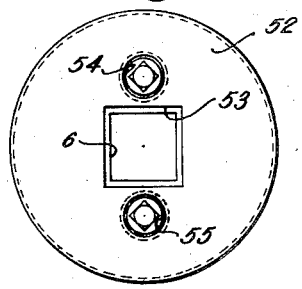
Figure 16:
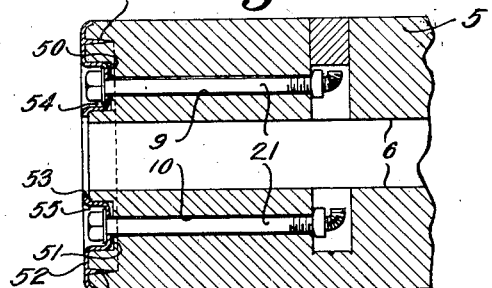

The roll 5 shown in Figs. 16 and 17 is substantially identical to that shown in Fig. 8, except that it is provided with a pair of diametrically disposed cylindrical recesses 50 and 51 which communicate respectively with the openings 9 and 10. The cap member 52 is substantially annular-shaped, the inner periphery of which defines a polygonal-shaped opening 53 which registers with the bore 6 of the roll. The cap member 52 is also provided with a pair of diametrically disposed recessed portions 54 and 55 which fit into the recesses 50 and 51, respectively, of the roll, each of the recessed portions 54 and 55 being furnished with openings which register with the openings 9 and 10, respectively. The recessed portions 54 and 55 receive the heads of the fastening elements 21 and cooperate with the intermediate flange 58 to hold the cap member against movement radially of the roll.

Figure 19:
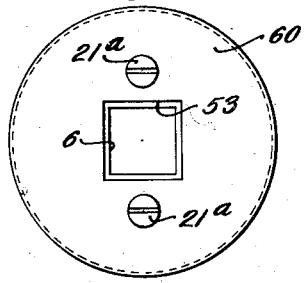
Figure 18:
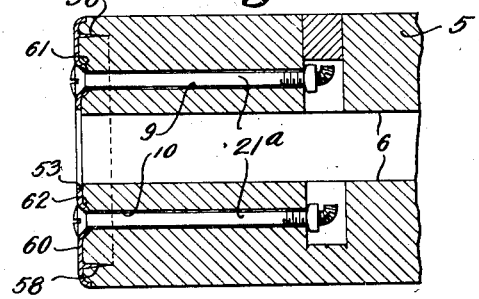

In the embodiment shown in Figs. 18 and 19 the cap 60 is provided with countersunk portions 61 and 62 (in place of the cylindrical recesses 54 and 55 shown in Figs. 16 and 17) which snugly fit into the countersunk ends of openings 9 and 10 in the roll. The countersunk portions 61 and 62 receive the conical-shaped heads of the fastening elements 21ª and cooperate with the intermediate flange 58 to hold the cap against radial displacement.

Figure 21:
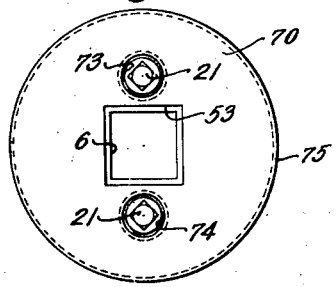
Figure 20:
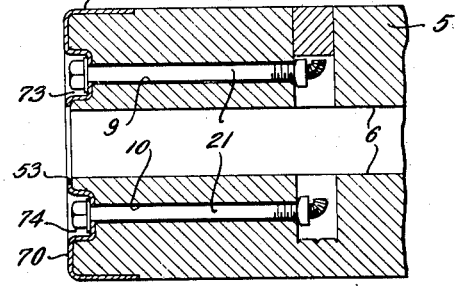
Figure 23:
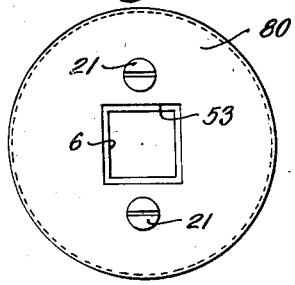
Figure 22:
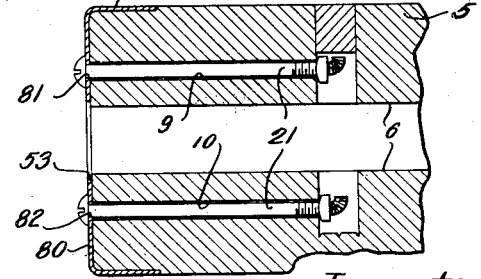

In the embodiments shown in Figs. 20 to 23, the intermediate flange has been dispensed with and the outer peripheries of caps 70 and 80 are furnished with a flanged member 75 similar to that shown in Fig. 2. The roll shown in Figs. 20 and 21 is provided with recessed portions 73 and 74 intermediate its central opening and periphery, as in the embodiment shown in Figs. 16 and 17, while in the embodiment shown in Figs. 22 and 23 the body portion of the cap 80 is substantially flat and is provided with openings 81 and 82 which register with openings 9 and 10, respectively, of the roll.

While I have shown and described different embodiments of the invention, I wish it to be understood that various changes in shape, proportion, and arrangement of parts, as well as the substitution of equivalent elements for those herein shown and described, may be made without departing from the spirit and scope of the invention as set forth in the appended claims.

I claim:

1. A roll of the character described having a body portion provided with an axial bore to receive a shaft, the roll body having a transverse opening adjacent to its end, a reinforcing cap including driving means engageable with said shaft, said cap fitting about the end of said roll adjacent to said transverse opening, fastening means for holding said cap in position, said means engaging said cap and extending longitudinally within the body portion of said roll between its bore and its periphery and projecting into said transverse opening, and means within said transverse opening for locking said fastening means in position.

2. A roll of the character described having a body portion provided with an axial bore to receive a driving shaft, the roll body having a transverse opening adjacent to one end, a driving member arranged at one end of the roll, fastening means for securing said driving member in position, said means engaging said driving member and extending longitudinally within the body portion of said roll between its bore and its periphery with its end portion projecting into said transverse opening, and locking means associated with said end for anchoring said fastening means firmly in position.

3. A roll of the character described having a body portion provided with an axial bore to receive a driving shaft, the roll having a transverse opening adjacent to one end, a reinforcing cap fitting about one end of said roll, said cap having a recess concentric with the roll, a driving plate disposed in said recess, said driving plate having an opening registering with the axial bore in the roll, fastening means for securing said cap and plate in position, said means engaging said driving plate and extending longitudinally within the body of said roll between its bore and its periphery with its end projecting into said transverse opening, and locking means associated with said end for anchoring said fastening means firmly in position.

4. A roll of the character described having a body portion provided with an axial bore to receive a driving element, the roll having a concentric recess in its end and a transverse opening adjacent to said end, a reinforcing cap fitting about one end of said roll, said cap having a portion fitting within said recess, a drive member mounted in said portion of the cap, fastening means for securing said cap and drive member in position, said means engaging said drive member and extending longitudinally within the body portion of the roll between its bore and its periphery and having a threaded end projecting into said transverse opening, and locking means in threaded engagement with said end for anchoring said fastening means in position.

5. A roll of the character described having a body portion provided with an axial bore to receive a driving shaft, said roll having a transverse opening adjacent to one end, a reinforcing cap fitting about one end of said roll, said cap having a concentric recess, a drive member having an opening registering with said axial bore and disposed in said recess, fastening means for securing said cap and drive member in position, said fastening means engaging said drive member and extending longitudinally within the body portion of said roll between its bore and its periphery and having a threaded end projecting into said transverse opening, and means for anchoring said fastening means in position, said means comprising a member in threaded engagement with the end of said fastening means and means for restraining relative movement between said member and fastening means.

6. A roll of the character described having a body portion provided with an axial bore to receive a driving shaft, said roll having a transverse opening adjacent to one end, a reinforcing cap fitting about said end of the roll, said cap having a concentric recess, a driving member having an opening registering with said axial bore and disposed in said recess, fastening means for securing said cap and driving member in position, said fastening means extending longitudinally within said roll and having a threaded end projecting into said transverse opening, and means for anchoring said fastening means in position, said means comprising a member in threaded engagement with the end of said fastening means, and radially disposed spring steel wings carried by said member, said wings engaging the threaded end of said fastening means and forcibly restraining relative movement between said member and fastening means.

7. A roll of the character described having a body portion provided with an axial bore to receive a driving shaft, said roll having a transverse opening adjacent to said end, a reinforcing cap fitting about one end of the roll, said cap having a concentric recess, a driving member having an opening registering with said axial bore and disposed in said recess, fastening means for securing said cap and driving member in position, said fastening means engaging said driving member and extending longitudinally within the body portion of said roll between its bore and its periphery and having a threaded end projecting into said transverse opening, and means for anchoring said fastening means in position, said means comprising a member in threaded engagement with the end of said fastening means and a slotted locking member juxtaposed thereto, said locking member holding the end of said fastening means in its slotted portion and restraining relative movement between said member and fastening means.

FREDERICK C. WASHBURN.